INVENTORS
JOHN F. THOMAS
KARL H. KELLER

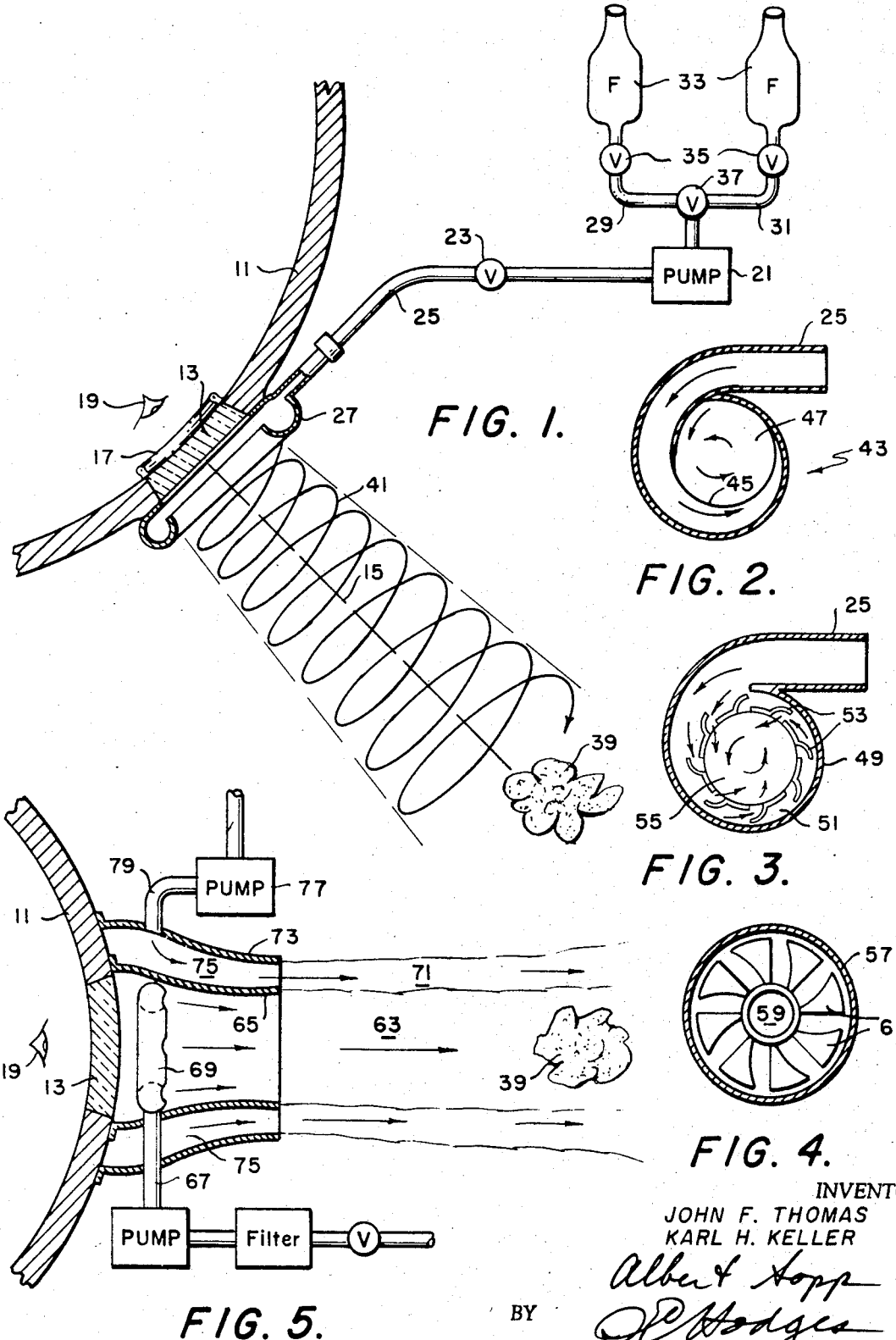

BY

ATTORNEYS

United States Patent Office 3,565,516
Patented Feb. 23, 1971

3,565,516
EXTENDED RANGE UNDERWATER OPTICS SYSTEM
John F. Thomas, Baltimore, and Karl H. Keller, Arnold, Md., assignors to the United States of America as represented by the Secretary of the Navy
Filed July 25, 1969, Ser. No. 844,950
Int. Cl. G02f 3/00; B01d 15/00; G03b 19/00
U.S. Cl. 350—319    20 Claims

ABSTRACT OF THE DISCLOSURE

An extended range undersea clear water viewing system conserving the clear water supply capability. Range is extended by containing flow of clear water toward viewed object by means of solid body boundaries or by flowing turbid water boundaries, or both, and by generating vortex flow.

---

The invention described herein may be manufactured and used by or for the Government of the United States of America for governmental purposes without the payment of any royalties thereon or therefor.

BACKGROUND OF THE INVENTION

This invention constitutes an improvement over the invention described in application Ser. No. 590,104 filed on Oct. 27, 1966, now U.S. Pat. No. 3,482,903, issued on Dec. 9, 1969. The arrangement in the above noted application provided enhanced viewing of underwater objects by means of a tubular extension directing the clear water to the object.

However, clear water viewing of underwater objects in murky waters has been limited to rather short distances. Typically, prior art attempts have included extended length diving masks containing clear water, short tubes having transparent end plates containing clear water, and underwater illumination arrangements. None of the prior art underwater viewing arrangements is particularly directed to or successfully overcomes the problem of extended range viewing from within a deep submersible vessel.

SUMMARY OF THE INVENTION

According to the present invention there is provided an improved, novel arrangement for viewing thru turbid waters at distances considerably greater than in the past. While applicants' aforementioned copending application does provide for viewing of objects some distance from the submersible, the present invention employs improved apparatus for greatly increasing the viewing distance. In one embodiment of the present invention a vortex generator is located adjacent a viewing port of the submersible. Clear water is brought into the vortex generator at a high flow rate and is then directed in a vortex or helical flow away from the viewing port toward the object to be viewed. The length of the vortex is considerable and may be increased according to pump capacity.

In another embodiment the flow of clear water is directed essentially axially away from the viewing port and turbid water is directed parallel thereto as a hollow cylindrical wall of turbid water surrounding the clear water flow. The turbid water "wall" increases the viewing distance thru the clear water because there is less relative motion between clear water particles and immediately adjacent turbid water particles, thereby decreasing turbulence at the clear water/turbid water boundary.

In another embodiment, solid wall boundary means such as a flexibly walled collapsible bag which is elongated when extended, surrounds the clear water column. The bag may be closed or open at its farthest end opposing the viewing port. The force of the clear water pumped into the bag extends the bag by virtue of flow reacting body means on the bag reacting to the flow. For example, the flow may push directly against body portions of the bag or expand the bag by reactive force. A stream of ambient turbid water may be directed parallelly with the walls of the extended bag to flow therealong and, at the open end of the bag, form a hollow cylinder of flowing ambient water surrounding the flowing clear water to yet further extend the clear water column and thus the viewing distance.

Accordingly, included among the objects of the present invention are the provision of:

An extended range viewing arrangement of improved construction for enabling viewing of objects thru turbid fluids such as ambient or murky sea water over considerable distances;

An extended range viewing arrangement employing ambient turbid water flow enhancement of a clear water column to extend the effective length of the clear water column;

An extended range viewing arrangment employing solid and fluid body boundary means enhancing the flow length of a clear water column; and An extended range viewing system employing vortex flow of clear water to extend its axial length as a viewing column in ambient, turbid water.

BRIEF DESCRIPTION OF THE DRAWINGS

The above and other objects, features and advantages of the present invention will become better understood by reference to the accompanying drawings in which like numerals represent like parts and in which:

FIG. 1 is a view in modified cross-section of an embodiment of the invention in which vortex flow is employed;

FIGS. 2–4 are views in transverse cross-section of respective vortex generators; and FIGS. 5–8 are views in cross-section of respective different embodiments of the present invention providing enhanced clear water column viewing.

DETAILED DESCRIPTION AND OPERATION

Figure 6:
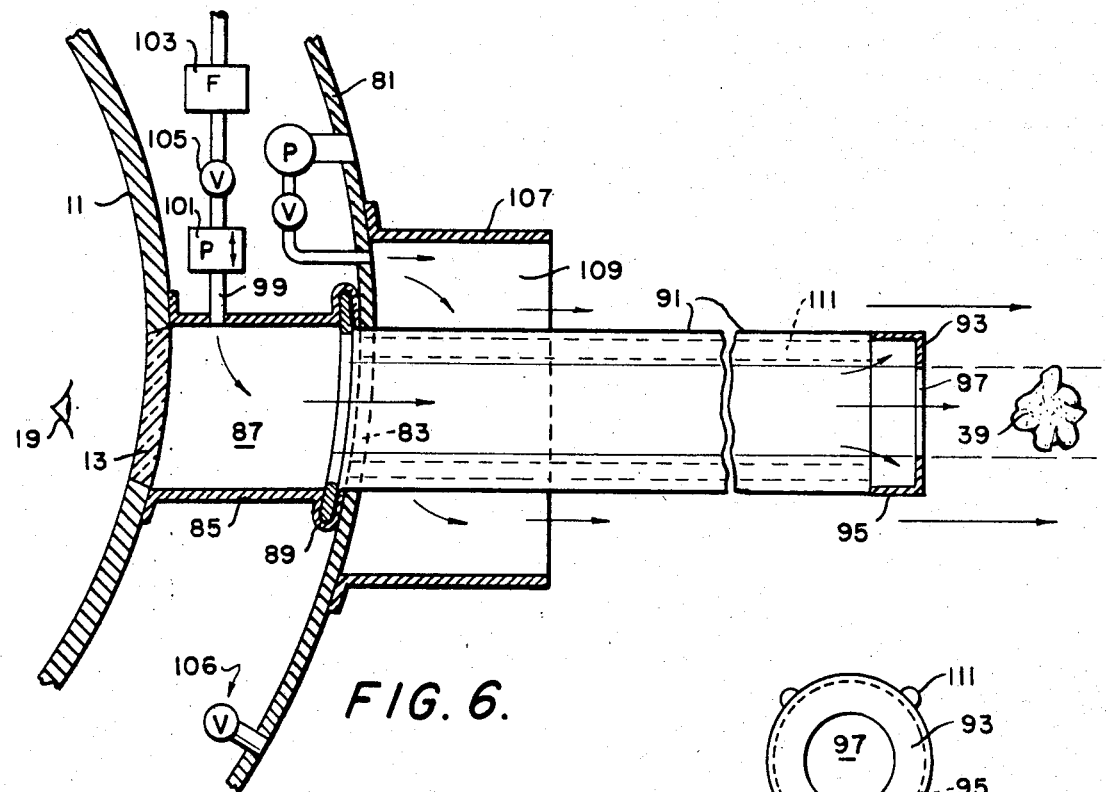

Reference is now made to FIG. 1 illustrating the clear water column vortex version of the invention. A deep submersible vehicle or other watercraft is represented by the numeral 11 and has a viewing port 13 illuminated directionally along a viewing axis 15 by means of an annular reflector lamp 17 for a viewer's eye or other optical receiver 19. A pump 21 which may be located externally of the pressure wall of watercraft 11 provides clear water via a valve 23 and pipe 25 to a vortex generator 27. Clear water is made available to the pump 21 by means of parallel input lines 29 and 31 each having a filter 33 and control valve 35 leading to a branch or T valve 37, thereby affording intake of ambient water on one line and back flushing on the other line as described in the aforementioned co-pending application. Of course, all of the valves may be remotely controlled from within watercraft 11 in any suitable well known manner.

The object to be view is indicated by the numeral 39. The watercraft 11 is lined up so that the object 39 lies essentially along viewing axis or line of sight 15. Application of clear water to the vortex generator 27 produces a swirl or vortex 41 which has an axial direction flow component producing a clear water column extending to, or almost to, the object 39.

Suitable vortex generators are shown in FIGS. 2–4. In the version shown in FIG. 2, clear water from the pump 21 is brought into a generally circular housing 43 tangentially via the conduit or pipe 25. The housing 43 may have its own integral back wall of transparent material or, as shown in FIG. 1, the wall and port of the vessel may act as the back wall. The vortex flow output side of the housing 43 is defined by an annular wall section 45 surrounding a central opening 47 enabling clear water to be ejected as a swirl axially along the line of sight.

The vortex generator shown in FIG. 3 has a generally circular housing 49 with an internal annular wall 51 terminating at its inner periphery at a plurality of vanes 53 mounted thereon and oriented to direct clear water received tangentially via pipe 25 tangentially or secantially inward to produce a swirl or vortex in a central opening 55.

The FIG. 4 version of a vortex generator employs a generally cylindrical housing 57 having rotatably mounted thereon a hub 59 therein a plurality of radial, canted vanes 61 made of transparent material. Clear water at high pressure or high flow rate may be fed into the housing 57 in any suitable manner (not shown) thereby forcing the vanes to rotate, resulting in a vortex of clear water.

It is to be understood that any other suitable means may be employed to provide a vortex of clear water, and that the vortex generators disclosed are by way of illustration and not limitation.

Referring to FIG. 5, there are employed two concentric streams of water directed toward the object 39. An inner stream 63 is composed of clear water confined in tube 65 attached to and surrounding the port 13. A valve, pump and filter in an intake line 67 are generally indicated and produce clear water for the stream 63 via an annular outlet pipe 69 adjacent the viewing port 13.

An outer stream 71 is produced by means of an outer tube 73 surrounding the inner tube 65 to provide an annular space 75 therebetween in which the stream flows. A pump 77 provides via a pipe 79 ambient turbid water for the stream 71 which surrounds the stream 63. The flow in streams 63, 71 may be axial or vortical. Because the turbid water stream 71 moves at zero or near zero speed relative to the clear water stream 63, there is less turbulence at the outer boundaries of the clear water stream 63 resulting in less departure of clear water particles from its stream. Therefore, the clear water stream is enabled by its surrounding turbid water stream to penetrate the ambient turbid water substantially further in the axial or line of sight direction than if unaided.

Figure 7:
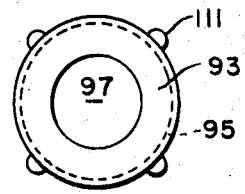

Reference is now made to the embodiment of FIGS. 6 and 7 illustrating an extended range viewing system in relation to a double hulled submersible having an outer hull 81. The outer hull 81 is not a pressure wall, and it has a lateral opening 83 essentially in alignment with the port 13. A tube 85 has its wall surrounding said port and said opening 83 and extends therebetween to provide a closed space 87 between the port and opening. The tube 85 has adjacent the opening 83 a flange 89 U-shaped in transverse cross-section for attachment in the opening of the U one end of an extensible bag 91. The bag 91 may be made of any suitable flexible material such as a plastic, and the material may be transparent. The bag 91 when extended may be generally cylindrical and has its wall extending axially thru the hole 83.

The other end of the bag 91 is composed of an essentially rigid flat plate 93 preferably of transparent material having a cylindrical wall 95 attached in any suitable manner to the wall of the bag 91. The plate 93 has a central opening 97.

Clear water is introduced under pressure to the bag 91 by means of a conduit 99 having a reversible flow pump 101, a filter 103 and a remote controlled valve 105. This space between the outer and inner hulls may be filled with clear water and that water used as a source until depleted and replaced by ambient water via an inlet and valve 106. As indicated by the arrows within the bag 91, the clear water fills the bag and escapes therefrom via the opening 97. However, part of the clear water flowing in the bag 91 impinges directly against the inner surface of the plate 93 thereby distending the bag 91 to its elongated position shown.

A cylindrical wall 107 is attached to the outer hull 81 in spaced relation to the bag 91 when extended, defining therebetween a longitudinal space 109 annular in transverse cross-section. Ambient turbid water is fed into the space 109 by means of a conduit 11 and a pump 113. As indicated by the arrows, the ambient water is directed thru the space 109 parallel to the wall of bag 91 toward the object 39 to be viewed. The ambient water thus directed flows past the end of the bag 91 and serves to confine the clear water emerging from the opening 97 in the same manner as described in conjunction with FIG. 5. That is, the clear water column in the bag 91 is extended into the ambient water beyond the opening 97 by its own force of flow and is contained as such by the ambient water flow along the outside and beyond the extremity of the bag 91.

As best indicated in FIG. 7, the wall of the bag 91 may be stiffened by longitudinal ribs 111 of less flexibility than the bag material. The bag 91 may be collapsed axially affording clear viewing when retracted and filter 103 back flushed by reversing the direction of flow in pump 101.

Figure 8:
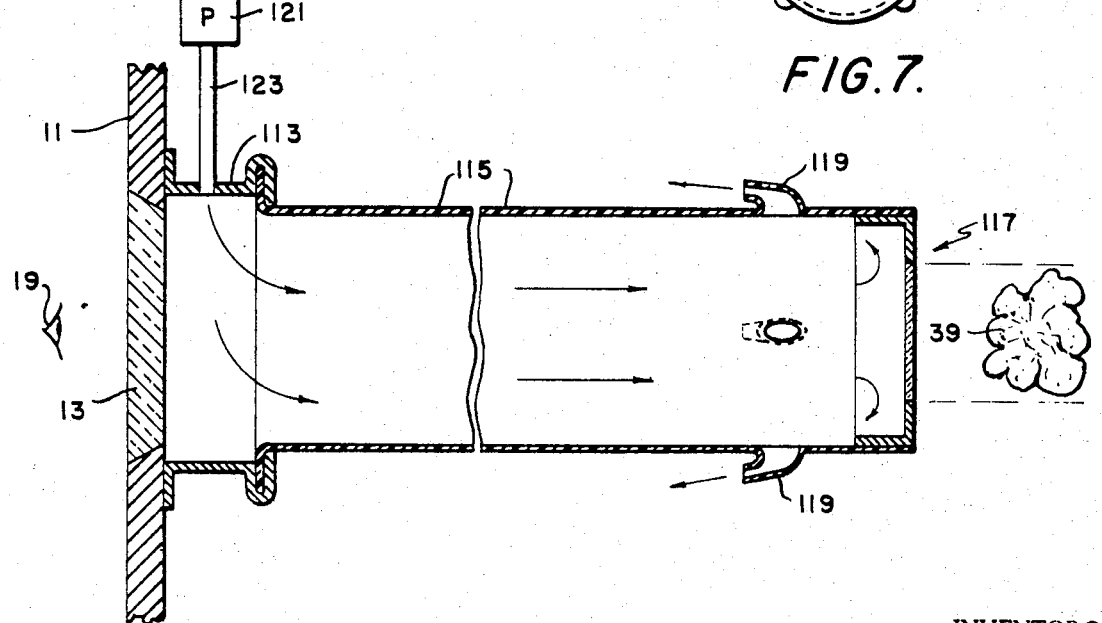

The invention embodied in FIG. 8 employs a tube 113 attached at one end to the wall of the submersible 11 in surrounding relation to the port 13. The other end of the tube 113 has a U-shaped flange for attachment thereto of one end of a flexible bag 115 which may be extended or retracted. The bag is closed at its other end by a flat transparent plate 117 suitably attached thereto. Near said other end of the bag a plurality of flow reaction nozzles 119 are suitably attached to the periphery of the wall.

Clear water is fed to the bag 115 by means of a pump 121 supplying via a conduit 123 clear water from a suitable source to the interior space of the tube 113. As indicated by the arrows, the clear water flows within the bag 115 toward the plate 117 and thru the nozzles 119. The nozzles 119 are oriented so that their exhaust flow is opposite to the extension direction of the bag 115, thereby extending the bag by means of reactive force.

It is appreciated that any other suitable source of clear water may be provided in addition to those shown and described. Clear water may be fed via conduits from remotely located tanks or even from clear water regions of the ambient water. Back flushing may be employed in all filter arrangements, of course. The clear and ambient water streams are understood to act also as scouring means in that their flow force is sufficient to remove sediment, etc., from the viewed object and circuitry. The optical properties of viewing ports and panels are not intended to be limited to shapes shown in the drawings but may take any suitable configuration. The viewing may be carried out photo-electrically or by any other suitable means.

While the present invention is deemed particularly useful for viewing at deep depths, the principles of the invention apply to any situation requiring clear viewing thru or into murky or turbid water.

Obviously many modifications and variations of the present invention are possible in the light of the above teachings. It is therefore to be understood that the invention may be practiced otherwise than as specifically described.

What is claimed is:

1. An extended range viewing system for use in ambient turbid water for providing clear viewing on a line of sight from a viewing station to an object located in the ambient water comprising:
  a source of clear water;
  pump means including means for producing a flow of clear water; and
  conduit means coupled to said pump means and including vortex flow generating means located adjacent the viewing station for directing clear water in a vortex from the viewing station toward the object along the line of sight thru the ambient water.

2. The system according to claim 1 wherein the viewing station is a viewing port located in a wall and wherein the conduit means comprises tube means surrounding said port and extending coaxially with axial flow components.

3. The system according to claim 1 wherein said pump means comprises the means for producing a flow of ambient water and wherein said conduit means comprises an inner tube for clear water oriented along the line of sight and an outer tube surrounding said inner tube defining a space therebetween for flow of ambient water therein essentially parallely with the flow of clear water to thus further confine the clear water flow within the ambient water flow beyond the end of the tubes.

4. The system according to claim 1 wherein said flow generating means comprises a housing water-tightly closed adjacent the viewing station and having an essentially spirally directed inlet passage inwardly bounded by a central outlet opening whereby the inlet water is directed essentially tangentially into said opening to thereby establish the vortex flow.

5. The system according to claim 4 wherein said flow generating means further comprises a plurality of inwardly canted vanes disposed in spaced apart relation at the inner periphery of said passage.

6. The system according to claim 1 wherein said flow generating means comprises an essentially cylindrical housing watertightly closed adjacent the viewing station and having a plurality of transparent radial vanes located therein to effectuate said vortex, said housing having an axis essentially coincident with the viewing line of sight.

7. An extended range viewing system for use in ambient turbid water for providing clear viewing from a viewing station to an object in the ambient water, the viewing station including a transparent panel located in a wall, comprising:
a source of clear water;
pump means including means for establishing a flow of said clear water;
hollow body means including expandable hollow body means having flexible walls attached at one end to the wall in watertight relation surrounding the transparent panel;
said hollow body means being expandable to an elongated position with its other end remote from the transparent panel and located between said panel and said object;
conduit means coupling the output of said pump to the interior space of said expandable body means to provide a stream of clear water therein;
flow reacting body means mounted on said expandable body means coupling the expandable body means to the stream of clear water therein whereby the force of the stream expands said expandable body means and provides an elongated viewing path between said panel and said object.

8. The viewing system according to claim 7 wherein said flow reacting body means comprises a transverse body portion located at said other end of said expandable body means.

9. The viewing system according to claim 8 wherein said transverse body portion comprises a panel having a central opening for passage of clear water therethru.

10. The viewing system according to claim 7 wherein said flow reacting body means comprises a transparent panel closing the other end of said expandable body means and nozzle means located near said other end for expelling clear water toward said one end to thereby expand said body means.

11. The viewing system according to claim 9 wherein said hollow body means further comprises tube means surrounding a portion of said expandable body means to define an essentially annular space therebetween, and wherein said pump means includes a pump for passing a flow of ambient water into said annular space co-directionally with the clear water flow whereby the clear water passing thru said central opening is further contained as a clear water stream by the resulting surrounding ambient water flow.

12. The viewing system according to claim 7 wherein said expandable body means comprises a tube means having flexible walls of plastic material.

13. The viewing system according to claim 12 wherein said tube means further comprises a plurality of spaced apart longitudinal stiffeners.

14. An extended range viewing system for use in ambient turbid water for providing clear viewing from a viewing station to an object located in the ambient water comprising:
inner and outer coaxial tubular body means having an essentially annular space therebetween, said inner and outer tubular means surrounding the transparent panel at their one end and being open at their other ends;
a source of clear water;
first means including a pump for passing a flow of clear water to the interior of said inner tubular means;
second means including a pump for passing a flow of ambient water to said annular space;
whereby the ambient water thus exiting from the open end of the annular space confines to axial flow the clear water exiting from the interior of said inner tubular means and provides an elongated viewing path of clear water between said viewing station and said object.

15. The system according to claim 14 wherein the wall is the pressure wall of a deep submersible and wherein the submersible includes an outer thin wall spaced apart from the pressure wall, said inner tubular means being attached to said inner pressure wall and said outer tubular means being attached to said outer wall, said first and second means being located between said walls.

16. The system according to claim 15 wherein the source of clear water comprises a reservoir of clear water in the space between the inner and outer walls, and means for admitting ambient water into said space as the clear water is depleted.

17. The system according to claim 15 wherein said inner tubular means comprises an essentially rigid tube section between said walls, and fluidly coupled thereto, a flexible tube section coaxial therewith extending beyond said outer wall, the walls of said flexible tube section being spaced apart from said outer tubular means, and body means for extending said flexible tube section responsive to the flow of clear water therein.

18. The method of providing a clear viewing path thru or in ambient turbid water comprising the step of: confining along a line of sight a stream of clear water inside a stream of ambient water coaxially therewith.

19. The method of providing a clear viewing path thru or into ambient turbid water comprising the step of: generating a vortex of clear water having axial flow components along a line of sight.

20. The method according to claim 19 comprising the additional step of: generating a stream of ambient water co-directional with and surrounding said vortex of clear water.

References Cited

UNITED STATES PATENTS

3,482,903    12/1969    Thomas et al. _____ 350—319

RONALD L. WIBERT, Primary Examiner

R. J. WEBSTER, Assistant Examiner

U.S. Cl. X.R.

61—69, 71; 95—11; 114—16; 356—246